US010956163B2

(12) United States Patent
Chung et al.

(10) Patent No.: US 10,956,163 B2
(45) Date of Patent: *Mar. 23, 2021

(54) PROCESSOR SUPPORT FOR HARDWARE TRANSACTIONAL MEMORY

(71) Applicant: ADVANCED MICRO DEVICES, INC., Santa Clara, CA (US)

(72) Inventors: Jaewoong Chung, Bellevue, WA (US); David S. Christie, Austin, TX (US); Michael P. Hohmuth, Dresden (DE); Stephan Diestelhorst, Dresden (DE); Martin Pohlack, Dresden (DE); Luke Yen, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 355 days.

This patent is subject to a terminal disclaimer.

(21) Appl. No.: 15/845,641

(22) Filed: Dec. 18, 2017

(65) Prior Publication Data
US 2018/0121204 A1    May 3, 2018

Related U.S. Application Data

(62) Division of application No. 12/814,025, filed on Jun. 11, 2010, now Pat. No. 9,880,848.

(51) Int. Cl.
*G06F 9/38* (2018.01)
*G06F 9/30* (2018.01)
*G06F 9/46* (2006.01)

(52) U.S. Cl.
CPC .......... *G06F 9/3842* (2013.01); *G06F 9/3004* (2013.01); *G06F 9/30087* (2013.01); *G06F 9/3834* (2013.01); *G06F 9/3857* (2013.01); *G06F 9/3859* (2013.01); *G06F 9/467* (2013.01)

(58) Field of Classification Search
None
See application file for complete search history.

(56) References Cited

U.S. PATENT DOCUMENTS

| 5,649,225 A * | 7/1997 | White | G06F 9/30032 712/1 |
| 2010/0153776 A1* | 6/2010 | Vick | G06F 9/30123 714/15 |
| 2010/0250861 A1* | 9/2010 | Park | G06F 12/0828 711/141 |
| 2010/0332768 A1* | 12/2010 | Gray | G06F 11/362 711/146 |

\* cited by examiner

*Primary Examiner* — John M Lindlof

(57) ABSTRACT

A processing core of a plurality of processing cores is configured to execute a speculative region of code a single atomic memory transaction with respect one or more others of the plurality of processing cores. In response to determining an abort condition for issued one of the plurality of program instructions and in response to determining that the issued program instruction is not part of a mispredicted execution path, the processing core is configured to abort an attempt to execute the speculative region of code.

8 Claims, 11 Drawing Sheets

PROCESSOR SUPPORT FOR HARDWARE TRANSACTIONAL MEMORY

CROSS-REFERENCE TO RELATED APPLICATION

This application is a divisional application of application Ser. No. 12/814,025, entitled "Processor Support for Hardware Transactional Memory" and filed on Jun. 11, 2010, which is incorporated herein by reference in its entirety.

BACKGROUND

Hardware Transactional Memory (HTM) is a mechanism in computer architecture for supporting parallel programming. With HTM, programmers may simply declare a group of instructions as being part of a single speculative region and the HTM hardware may then guarantee that the instructions in the region are executed as a single atomic and isolated transaction. Atomicity means that all the instructions of the transaction are executed as a single atomic block with respect to all other concurrent threads of execution on one or more other processing cores in the system. Isolation means that no intermediate result of the transaction is exposed to the rest of the system until the transaction completes. HTM systems may allow transactions to run in parallel as long as they do not conflict. Two transactions may conflict when they both access the same memory area and either of the two transactions writes to that memory area.

To implement HTM, significant complexity must be added to processors and/or to memory subsystems. To deal with this complexity, processor architects have traditionally limited the feature set of a processor that implements HTM. For example, traditional HTM processors cannot utilize out-of-order execution optimizations while executing a speculative region of code. Out-of-order optimizations allow a processor to exploit instruction-level parallelism by executing instructions out of program order, temporarily storing the results of those instructions, and then writing the results to the memory hierarchy when all preceding instructions have done so. Since HTM processors do not use out-of-order execution to execute instruction sequences that are inside of speculative regions, traditional HTM processors may not execute instruction sequences in speculative regions as quickly as would otherwise be possible.

SUMMARY OF EMBODIMENTS OF THE INVENTION

An apparatus and method are disclosed for implementing hardware transactional memory that supports out-of-order processing and branch prediction facilities within speculative regions. A processing core of a plurality of processing cores is configured to execute a speculative region of code as a single atomic memory transaction using a hardware transactional memory system. The processing core may employ out-of-order processing and branch-prediction techniques within the speculative region. If the processing core detects that executing or retiring a given instruction would cause an abort condition (such as speculative buffer overflow, data conflict, etc.), the processing core first verifies that the instruction is not on a mispredicted execution path before performing the abort. If the processing core determines that the instruction is on a mispredicted execution path, the processing core does not abort the transaction due to the given instruction.

In some embodiments, determining that the instruction is not on a mispredicted execution path comprises determining that all instructions issued before the given instruction in program order have been retired. For example, in some embodiments, the processing core may respond to determining that the given instruction would cause an abort condition by setting a flag of a results queue entry corresponding to the instruction (e.g., reorder buffer entry). Subsequently, when the processing core may determine that the given instruction is not part of a mispredicted execution path by determining that the results queue entry is at the head of the results queue.

In various embodiments, the processing core and various others of the plurality of processing cores may be implemented as part of the same chip or different chips. In some embodiments, the processing core may implement a multi-level speculative buffer (e.g., using the data cache and/or load/store queue mechanisms).

Figure 1:
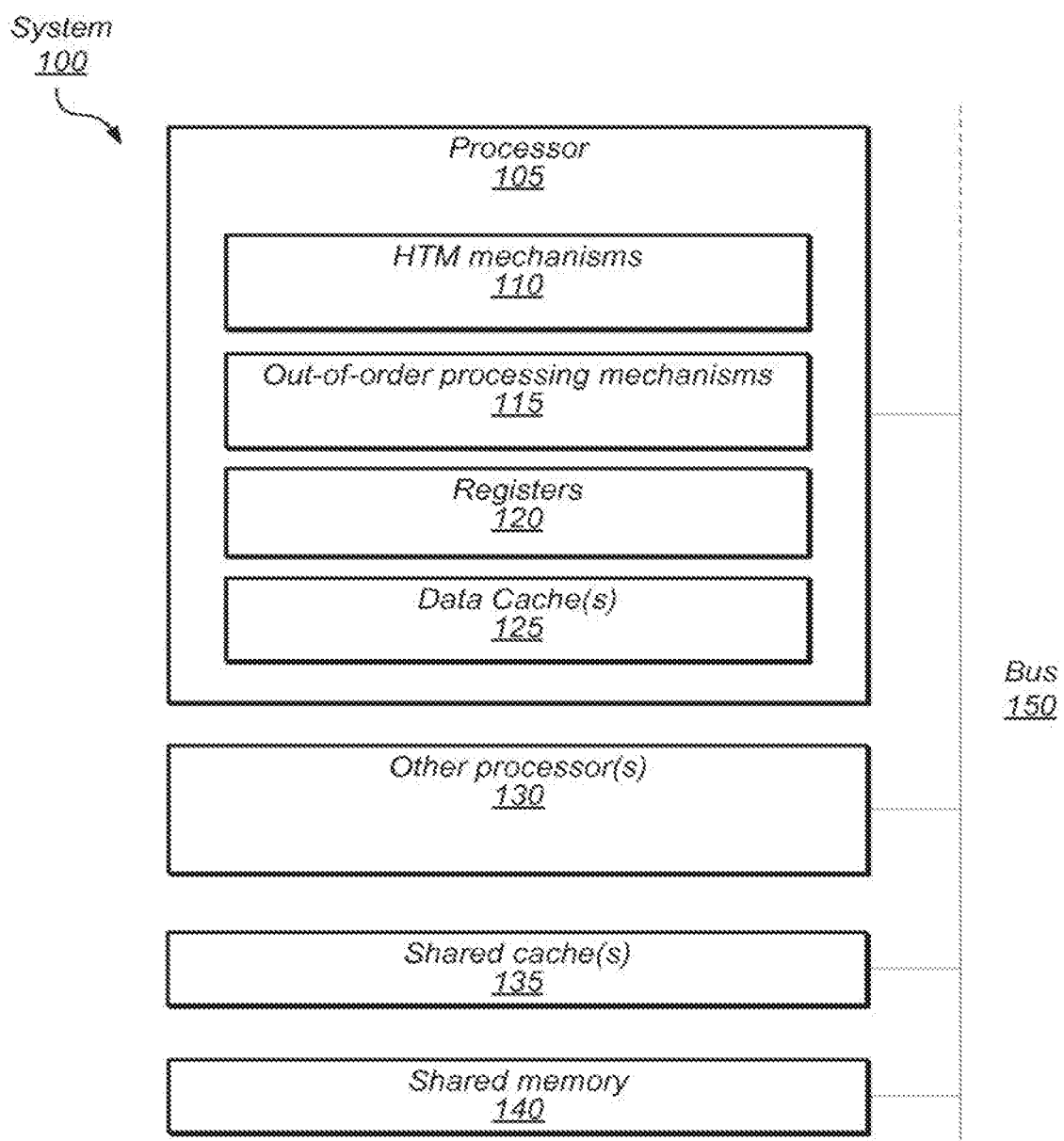
FIG. 1 is a block diagram illustrating one embodiment of a system configured to implement hardware transactional memory with out-of-order processing.

While the present disclosure includes several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling without the spirit and scope of the present disclosure. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

A processor that implements a hardware transactional memory system (HTM) may receive computer program code that includes one or more speculative regions, each comprising one or more instructions. The processor includes hardware facilities (e.g., circuits) that ensure that the processor executes such speculative regions as respective atomic memory transactions. As used herein, executing instructions as a transaction (or "transactionally") means that the processor executes such instructions as a single isolated, atomic block with respect to other threads of execution in the system. The term HTM is used herein to differentiate the transactional memory system from a software transactional memory system, or STM, in which a separate software system is used to manage execution of speculative regions.

According to various embodiments, a processor may implement a hardware transactional memory system that is capable of out-of-order execution of instructions within speculative regions. In such embodiments, a group of instructions in a speculative region may be executed out of program order, but still as a single atomic and isolated memory transaction.

As used herein, the term program order refers to the order in which a processor executing a given program fetches the program's instructions for execution. This order is dynamic and may depend on the dynamic control flow of the given program. Since dynamic control flow may include forward and/or backward jumps in the program code, dynamic program order as discussed herein may not strictly coincide with static program order (i.e., order in which the instructions are stored in an executable).

In some embodiments, a processor may fetch, decode, and issue (to respective functional units) instructions in a speculative region in program order, allow the functional units to execute the instructions out of program order (e.g., as soon as each instruction's respective operands are available), but then write back the results of each instruction to memory in program order. These three portions of execution (which may each correspond to one or more pipeline stages, in certain embodiments) may be respectively referred to herein as issue, execute, and retire.

FIG. 1 is a block diagram illustrating a system configured to implement hardware transactional memory with out-of-order processing, as described herein. According to the illustrated embodiment, system 100 includes multiple processors, including processor 105 and other processor(s) 130. As used herein, the term processor refers to a processing core configured to execute computer program instructions. Therefore, the term processor may refer to a physical or logical (e.g., symmetric multi-threading) processing core on a dedicated chip or on a chip that includes one or more other processing cores (e.g., chip multi-processor). In the latter case, processors 105 and 130 may exist on the same chip and be connected by an on-chip network rather than a system bus such as 150. Although the general term "processor" is used to describe the embodiments herein, the term itself is not meant to limit embodiments to particular arrangements of processing cores or their distribution on one or more chips.

As illustrated in FIG. 1, processor 105 comprises HTM mechanisms 110, which includes one or more hardware units configured to detect and/or to execute speculative regions of code as isolated, atomic transactions. These HTM mechanisms may include various components used by the processor to maintain correct program behavior while performing out-of-order processing within speculative regions. Processor 105 also includes out-of-order processing mechanisms 115, which includes one or more hardware units configured to execute program instructions out of program order, including program instructions inside speculative regions.

Figure 5:
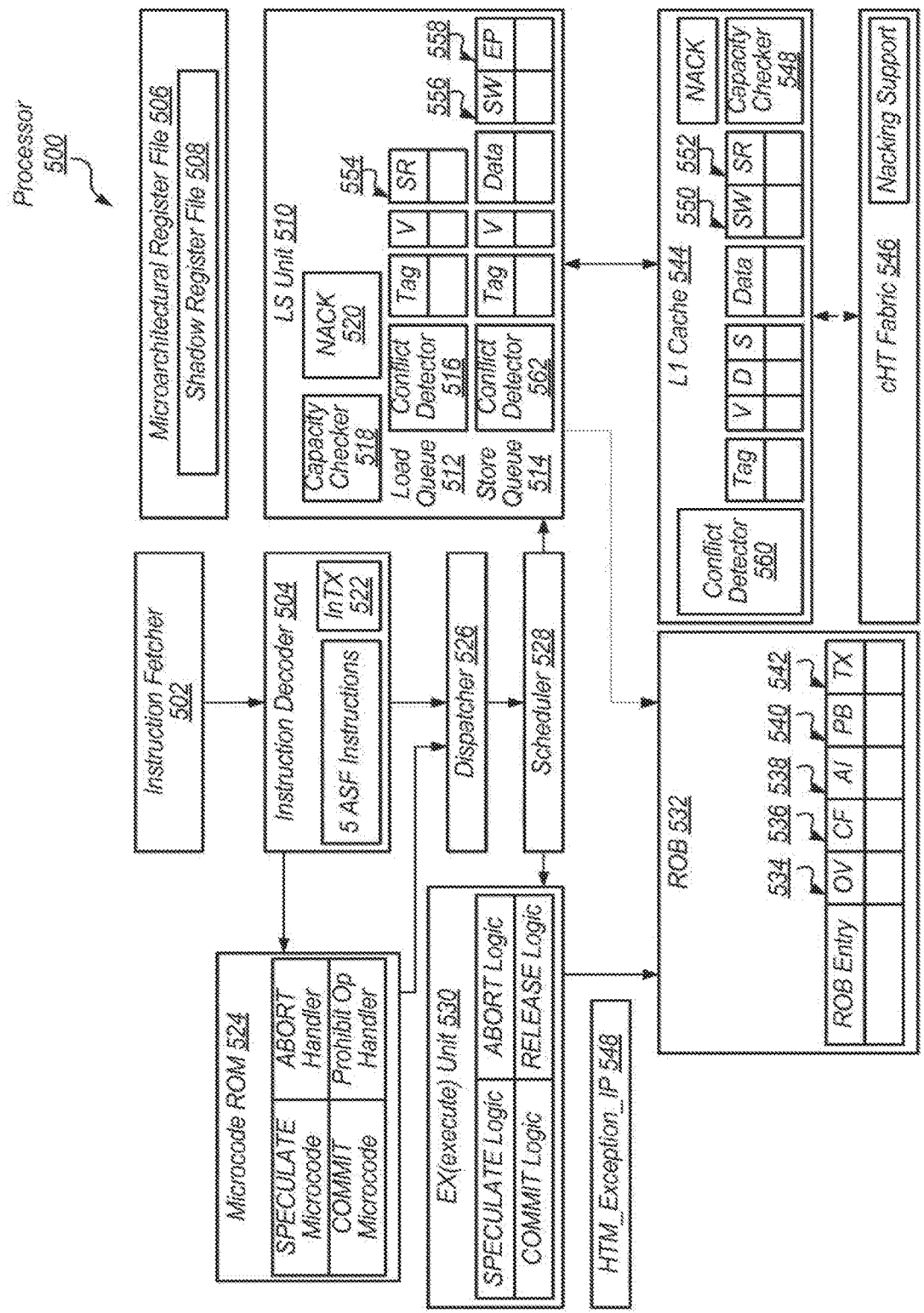
FIG. 5 is a block diagram illustrating components of a processor configured to perform out-of-order processing within speculative regions using a hardware transactional memory system, according to some embodiments.

In various embodiments, HTM mechanisms 110 and of out-of-order processing mechanisms 115 may overlap arbitrarily with each other and/or with other components. For example, as shown in the embodiment of FIG. 5, a reorder buffer may include both entries for out-of-order processing and flags for transactional memory processing. In such as an embodiment, portions of the reorder buffer may constitute HTM mechanisms 110 and out-of-order processing mechanisms 115. The different flags described herein may be implemented variously as one or more bits whose values indicate respective conditions.

As shown in the illustrated embodiment, processor 105 may also include any number of registers 120, which may be implemented as a microarchitectural register file, and one or more local data caches 125 (e.g., L1 cache). Data caches 125 may cache data from shared memory 140 for quick access by processor 105. In embodiments where data cache(s) 125 include multiple caches, those caches maybe be configured to function as a cache hierarchy. Processor 105 and/or data caches 125 may include cache coherence mechanisms configured to communicate with other processors (e.g., 130) to maintain a consistent view of memory in the presence of separate private caches used by different processors. In embodiments where processor 105 includes multiple processing cores, one or more of caches 125 may be shared by various ones of these processing cores.

According to the illustrated processors 105 and 130 are connected via bus 150 to each other, to shared memory 140, and to any number of shared data caches 135. As used herein, the term memory hierarchy refers to a system's shared memory and the series of caches (i.e., cache hierarchy) used by a given processor to store data.

In some embodiments, processors 105 and 130 may utilize bus 150 to communicate messages to one another, such as cache coherence messages as part of a cache coherence protocol (e.g., MESI, MOESI). In such embodiments, multiple processors such as 105 and 130, may maintain a consistent view of shared memory data cached in their respective caches.

Figure 2A:
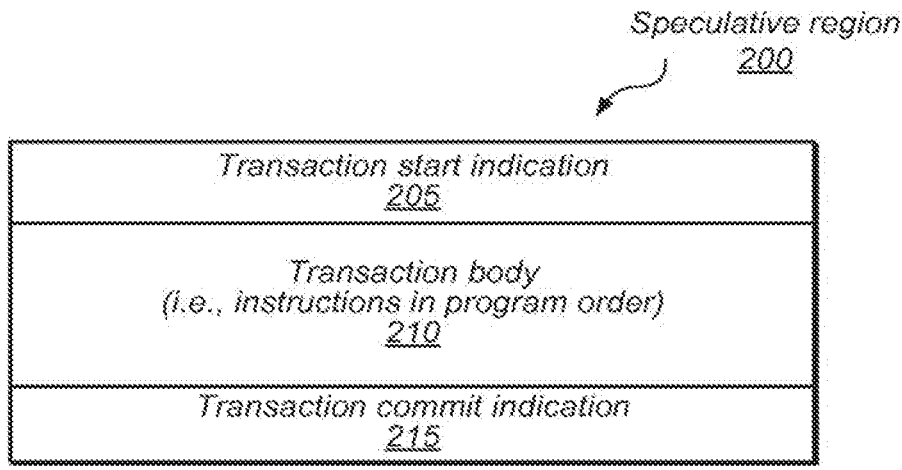
FIG. 2a is a block diagram illustrating the components of a speculative region of code, according to some embodiments.

FIG. 2a is a block diagram illustrating the components of a speculative region of code, according to some embodiments. According to the illustrated embodiment, speculative region 200 begins with a transaction start indication 205, which is followed by a transaction body 210 of one or more instructions, and ends with a transaction commit indication 215.

In some embodiments, transaction start indication may comprise a special-purpose instruction indicating the start of a speculative region. For example, the start indication 205 may include a SPECULATE instruction indicating the start of a speculative region. In other embodiments, the start indication may correspond to a general-purpose instruction, such as lock acquisition, that may be indicative of a speculative region of code.

Transaction body 210 may include one or more program instructions, which may include one or more memory operations. In some embodiments, transaction body 210 may include a first subset of memory operations that are designated as part of the transaction and a second subset of memory operations that are designated as not part of the transaction. In such instances, the HTM may be configured to execute transactionally only those instructions designated as part of the transaction and to provide no such atomicity or isolation guarantees for the other instructions in the body.

As indicated in the illustrated embodiment, speculative region 200 may include a commit indication (e.g., 215) indicating the end of the speculative region started by start indication 205. In some embodiments, the commit indication may comprise a special-purpose COMMIT instruction. In other embodiments, the commit indication of 215 may correspond to a general-purpose instruction, such as a release of a lock acquired earlier, such as in start indication 205.

Figure 2B:
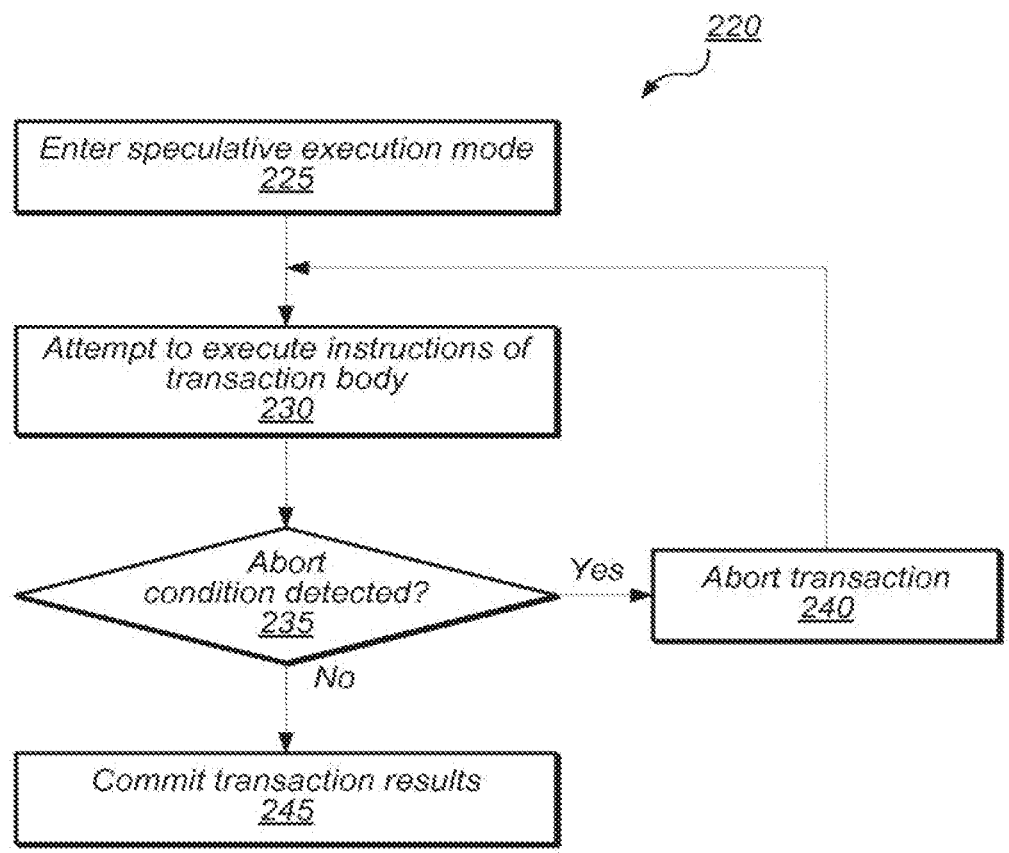
FIG. 2b is a flow diagram illustrating a method for executing a speculative region of code, such as speculative region 200, as a memory transaction, according to various embodiments.

FIG. 2b is a flow diagram illustrating a method for executing a speculative region of code, such as speculative region 200, as a memory transaction, according to various embodiments. The method of FIG. 2b may be performed by a processor that implements an HTM with out-of-order processing capabilities, as described herein.

According to the illustrated embodiment, method 220 begins when the processor enters a speculative execution mode, as in 225. The processor may perform this step in response to detecting a transaction start indication, such as 205 in speculative region 200.

After entering the speculative mode of execution, the processor may attempt to execute the instructions of the transaction body, as in 230. These instructions may correspond to those of transaction body 210, and may include memory instruction, arithmetic instructions, floating point instructions, branch instructions, special-purpose transactional instructions (e.g., ABORT, RELEASE, etc.) as discussed below, and/or other instructions in a different order than the program order.

As illustrated in FIG. 2b, if the HTM encounters an abort condition (e.g., data conflict, ABORT instruction, speculative buffer overflow, etc.) during the transaction attempt, as indicated by the affirmative exit from 235, the processor may abort the transaction, as in 240. Depending on the particular implementation, aborting the transaction may comprise undoing, dropping, or otherwise obviating any or all effects of the transaction attempt on data in the memory hierarchy. If the transaction attempt is aborted, the processor may then reattempt the transaction, as indicated by the feedback loop from 240 to 225.

According to the illustrated embodiment, once a transaction attempt is successfully completed with no abort conditions, as indicated by the negative exit from 235, the processor may commit the transaction results, as in 245. In some embodiments, committing the transaction may comprise logically moving the memory results of the transactional attempt from a speculative buffer to the shared memory. In various embodiments, this logical move may include physically copying data to the memory hierarchy, adding or removing flags from data buffered in the memory hierarchy, and/or other techniques that make the data visible to one or more other processors.

Figure 3:
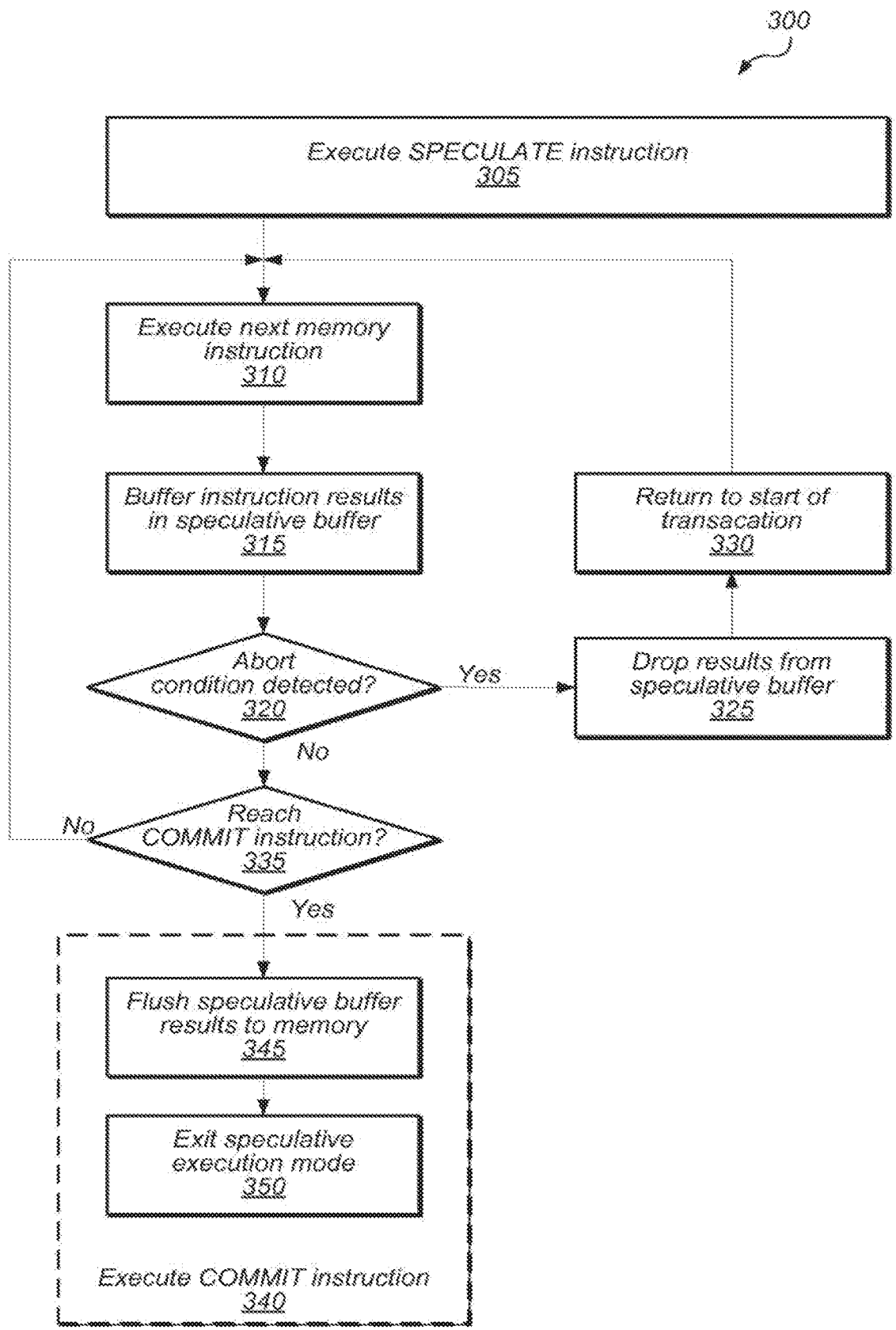
FIG. 3 is a flow diagram illustrating a method for executing a speculative region of code, such as speculative region 200, as a memory transaction, according to various embodiments.

FIG. 3 is a flow diagram illustrating a method for executing a speculative region of code, such as speculative region 200, as a memory transaction, according to various embodiments. Method 300 may be considered a specific implementation of method 220 in FIG. 2b and may be performed by a processor executing a speculative region of code as a transaction.

According to the illustrated embodiment, method 300 begins when the processor encounters and execute a SPECULATE instruction, as in 305. The SPECULATE instruction of 305 may correspond to a special-purpose instruction used by the programmer to indicate the start of a speculative region of code that should be executed as an isolated atomic transaction. In such embodiments, executing the SPECULATE instruction may comprise entering a speculate mode of execution, as in 225 in FIG. 2b.

According to method 300, the processor may then attempt to execute the speculative region as indicated by the loop of 310-335. In this execution loop, the processor executes the next memory instruction (as in 310), buffers the results of the instruction in a speculative buffer (as in 315), and returns to execute the next instruction (as indicated by the affirmative exit from 335) until reaching a COMMIT instruction (as indicated by the negative exit, from 355). The results buffered its the speculative buffer may be referred to herein as speculative data.

In the illustrated embodiment, if an abort condition is detected during the transaction attempt (as indicated by the affirmative exit from 320) the processor drops the speculative data of the transactional attempt from the speculative buffer (as in 325), returns the instruction pointer to the start of the speculative region (as in 330), and restarts execution from the start of the speculative region.

According to the illustrated embodiment, if the execution loop of 310-335 reaches a COMMIT instruction (as indicated by the affirmative exit from 335), the processor may execute the COMMIT instruction (as in 340). This may comprise flushing the speculative data to the memory hierarchy (as in 345) and exiting the speculative execution mode (as in 350). In some embodiments, the COMMIT instruction may correspond to a special-purpose transactional memory instruction inserted by the programmer to indicate the end of a speculative region of code.

Figure 4:
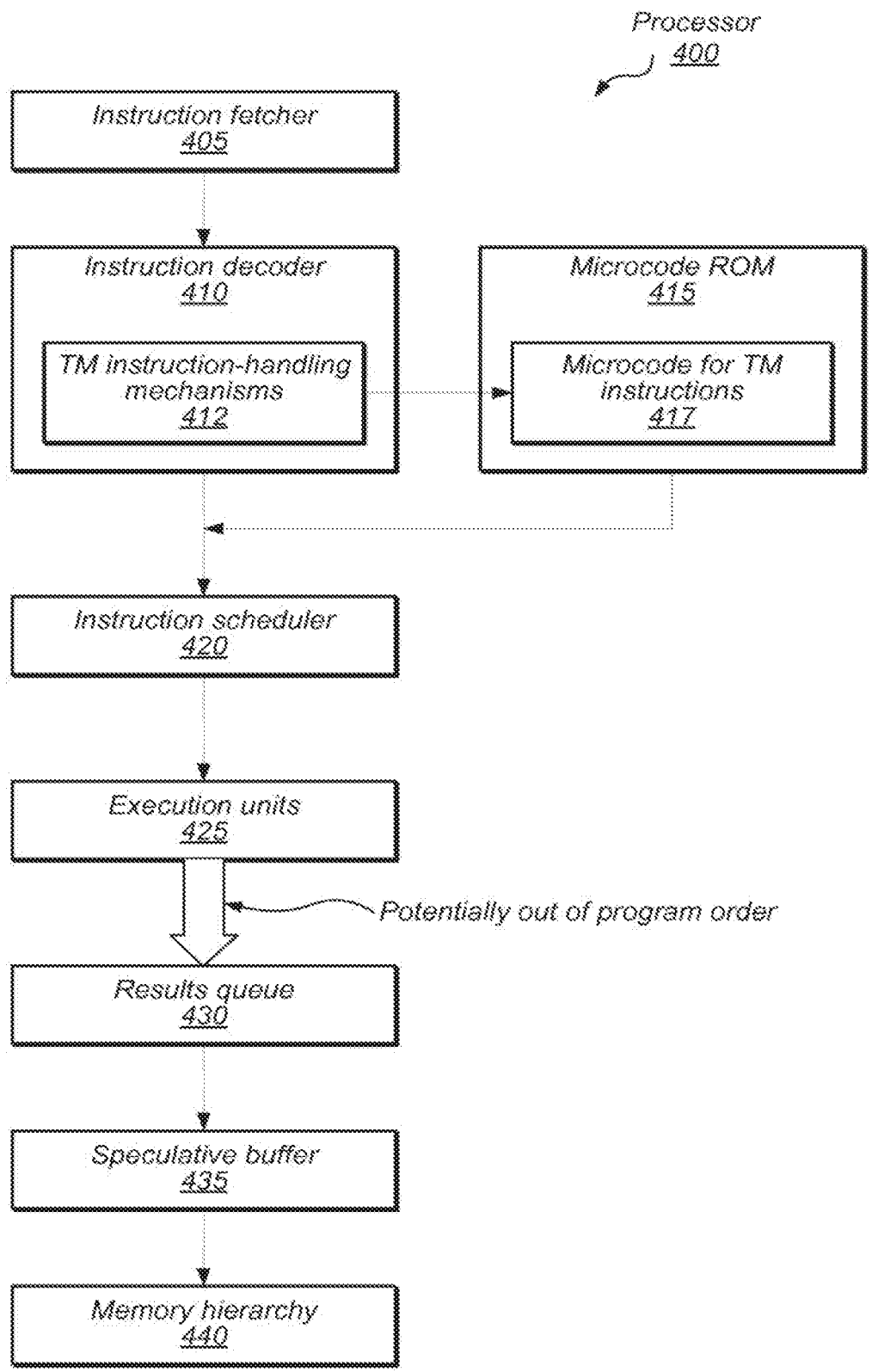
FIG. 4 illustrates a conceptual flow of information between logical components of a processor executing a speculative region out of order using HTM facilities, according to some embodiments.

FIG. 4 illustrates a conceptual flow of information between logical components of a processor executing a speculative region out of order using HTM facilities, according to some embodiments. Since the components of FIG. 4 are intended to be logical in nature, in specific embodiments, different one of these components may be implemented by one or more hardware components, be combined, be decomposed further, and/or overlap with other components. Specific embodiments are described in more detail below.

According to FIG. 4, processor 400 begins instruction processing using instruction fetcher 405. In some embodiments, instruction fetcher 405 may be configured to read the next instruction (or group of instructions) of the program being executed by processor 400. For example, instruction fetcher 405 may be configured to determine the next instruction to fetch based on a value held in an instruction pointer of the processor. The order in which the fetcher reads the instructions is referred to herein as program order.

After fetcher 405 reads the next program instruction, instruction decoder 410 may decode the instruction. Instruction decoder 410 may be configured to interpret the instruction and to take appropriate action. The decoding process and response may be dependent on the particular instruction set architecture (ISA) and its characteristics (e.g., fixed-length instructions, variable-length instructions, microcoded instruction, etc.).

According to the illustrated embodiment, instruction decoder 410 may include transactional memory instruction-handling mechanisms 412, which are configured to recognize some special-purpose transactional memory instructions (e.g., SPECULATE, COMMIT, etc.) and in response, to invoke respective microcode for executing such instructions (e.g., microcode 417 in microcode ROM 415). The microcode may correspond to a set of hardware-level instructions used to implement various higher-level machine code instructions that are defined in the ISA. In some embodiments, microcode may be stored on special high-speed memory, such as read-only memory 415. Such memory 415 may be private (dedicated) to processor 105 in certain embodiments. In some embodiments, microcode instructions may be executable to store data in microcode-dedicated registers such as in shadow register file 508, which may be implemented as a dedicated portion of microarchitectural register file 506.

According to the illustrated embodiment, after fetches the instruction and decoder 410 decodes it, instruction scheduler 420 may issue the instruction to an appropriate one of a plurality of execution units 425 for execution. For example, decoder 410 determines that execution of the instruction calls for integer arithmetic, it may issue the instruction to an integer arithmetic functional unit on the processor. Likewise, if the instruction is a memory load, the scheduler may issue the instruction to a load/store unit and so forth.

According to various embodiments, instruction scheduler 420 may issue multiple instructions in program order to one or more of execution units 425. However, out-of-order processing mechanisms may allow the execution units to execute the instructions in parallel, therefore potentially finishing execution out of program order. For example, consider a situation where a memory load instruction is followed in program order by an arithmetic ADD instruction. According to some embodiments, scheduler 420 may issue the load instruction to a load/store unit and subsequently issue the ADD instruction to an integer arithmetic unit. The two units may concurrently execute their respective instructions (i.e., instruction-level parallelism). However, if the operands of the ADD instruction are available, the arithmetic unit may finish executing the ADD instruction before the load/store unit finishes executing the load instruction, which may require substantial delay while the memory subsystem retrieves data from memory. Thus, execution units 425 may complete instructions out of program order, as indicated by the thick arrow exiting from execution units 425 in FIG. 4.

According to some embodiments, an execution unit may execute an instruction issued to it as soon as the instruction's operands are available and no data hazards exist (e.g., read-after-write, write-after-write, write-after-read, etc.). The execution unit may then write the results of execution to a results queue (such as 430) that may buffer the results of instructions executed out of program order and flush the results to memory in program order. By flushing the results in program order, the processor maintains correct program behavior. When the results of an instruction are flushed to memory, the instruction is said to be retired.

In different embodiments, the results queue may take different forms. For example, in some embodiments, the results queue may be implemented as a reorder buffer (ROB). The ROB may contain a respective entry for each issued instruction that has not yet been retired. After executing the instruction, the execution unit may store the execution results in the ROB entry corresponding to the instruction. The processor may then write these results to memory in program order. For example, the processor may do so by identifying the ROB entry corresponding to the earliest instruction in program order (i.e., the entry at the head of the ROB), waiting for the instruction's results to be written to the entry, flushing the entry to memory, removing from the entry from ROB, and repeating the process. In various embodiments, results queue 430 may be implemented using different mechanisms, such as register renaming or other mechanisms.

While processor 400 executes a speculative region, it may regard the results in the results queue as speculative until the transactional attempt successfully commits. Therefore, according to various embodiments, rather than flushing speculative results from the results queue directly to memory, the processor may be configured to flush speculative results to a speculative buffer, such as 435.

As illustrated, speculative buffer 435 represents a logical entity that may be implemented by any number of physical components in different configurations and using different methods. For example, in some embodiments, speculative buffer 435 may comprise a first-level data cache (i.e., L1) on the processor that includes one or more flags indicating whether particular entries of the cache store speculative data. For example, in some embodiments, each cache entry may include respective SR and SW flags, each one indicating whether the data in the entry was speculatively read or written respectively.

In some embodiments, the processor may implement a speculative buffer using a load/store queue (LSQ). For example, the processor may mark data in a load, store, and/or load/store queue to indicate whether the data is speculative (e.g., had been speculatively read or written) and implement a policy that prevents speculative data from being flushed from such a queue to a memory.

In yet further embodiments, the processor may implement a combination of these two approaches. For example, the processor may normally flush speculative data from the results queue to the cache and mark it is speculative. However, if the processor detects that the cable has insufficient capacity to buffer the speculative data without evicting other speculative data (and thereby causing a speculative buffer overflow), the processor may begin buffering speculative data using an alternative (i.e., secondary) buffer, such as the LSQ mechanism described above. An example of such a processor is described in U.S. patent application Ser. No. 12/627,956, entitled "Multi-level Buffering of Transactional Data", filed Nov. 30, 2009, which is incorporated herein it is entirety by reference. Various other schemes and combinations may be used.

In various embodiments, if the processor aborts a transactional attempt, the processor may drop the speculative data from the speculative buffer. This process may depend on the particular implementation of the speculative buffer. For example, if the speculative buffer is implemented as one or more flags marking speculative data in an L1 cache, dropping the speculative data may comprise invalidating the data in the cache line.

If processor 400 does not abort the transactional attempt, but instead commits the transaction successfully, the processor may move the speculative data from the speculative buffer to the memory hierarchy (e.g., to L1 cache), where it is visible to other processors. This is shown in FIG. 4 as data moving from speculative buffer 435 to memory hierarchy 440.

In some embodiments, moving speculative data from a speculative buffer to the memory hierarchy may not necessarily include a physical copying operation. For example, if the speculative data is buffered in the L1 cache (e.g., stored and marked as speculative), moving the data from the speculative buffer to the memory hierarchy may comprise marking the data as non-speculative. Subsequently, the data may be managed as part of the cache coherence protocol being executed by the processor and/or be otherwise visible to other processors.

FIG. 5 is a block diagram illustrating the components of a processor configured to perform out-of-order processing within speculative regions using a hardware transactional memory system, according to some embodiments. In some embodiments, processor 500 may represent a more detailed implementation of processor 400 in FIG. 4.

FIG. 5 is a block diagram illustrating the components of a processor configured to perform out-of-order processing within speculative regions using a hardware transactional memory system, according to some embodiments. In some embodiments, processor 500 may represent a more detailed implementation of processor 400 in FIG. 4.

According to the illustrated embodiment, processor 500 includes an instruction fetcher 502 configured to fetch the next program instruction in program order, as described above. Processor 500 may further include an instruction decoder 504 for decoding instructions and dispatcher 526 for dispatching instructions to scheduler 528. Scheduler 528 is configured to issue instructions to various execution units, such as execute unit 530 and/or to load/store unit 510.

In the particular implementation of FIG. 5, processor 500 implements a results queue using a reorder buffer 532. Reorder buffer 532 may contain any number of entries, each corresponding to a respective issued instruction that has not yet been retired. Each entry in reorder buffer 532 includes a number of respective flags 534-542, which are used by the HTM to implement proper transactional execution, as described below.

Further regarding processor 500, the particular illustrated processor implements a speculative buffer using a combination of L1 cache 544 and LS unit 510. In some embodiments, processor 500 may be configured to flush speculative data to L1 cache 544, and to mark it as speculative using various flags (e.g., speculatively written flag 550 or speculatively read flag 552). However, if processor 500 attempts to store speculative data in L1 cache 544 but capacity checker 548 determines that the cache has insufficient capacity to buffer the new speculative data (e.g., if the cache set in which the new speculative data must be stored is already filled with other speculative data), then processor 500 instead buffer the speculative data in LS unit 510. For example, in the illustrated embodiment, each load entry in load queue 512 includes an SR flag 554 usable by the processor to indicate that entry contains speculatively read data. Similarly, each entry in store queue 514 includes an SW flag 556 usable to indicate that the entry includes speculatively written data. In such embodiments, processor 500 may be configured to retain entries in load queue 512 and/or in store queue 514 that contain speculative data, even after the respective instruction is retired.

In some embodiments, if processor 500 aborts a transaction attempt, it may clear the speculative buffer by invalidating all speculative data buffered in L1 cache 544 and any speculative data buffered in LS unit 510. In some embodiments, when the processor commits a transaction, it may flush the speculative data from the speculative buffer to memory. For example, the processor may mark the speculative data in L1 cache 544 or in LS unit 510 as non-speculative (e.g., by unsetting speculative flags of each entry). The processor may also flush the retired entries in LS unit 510 to L1 cache 544. Abort and commit methods are discussed in further detail below with regard to FIGS. 8 and 9.

According to various embodiments, an HTM system, such as that implemented by processor 500, may support special-purpose transactional memory instructions. For example, in some embodiments, the HTM may support the following instructions:

SPECULATE: marks the beginning of a speculative region of code

COMMIT: marks the end of a speculative region of code

Figure 6:
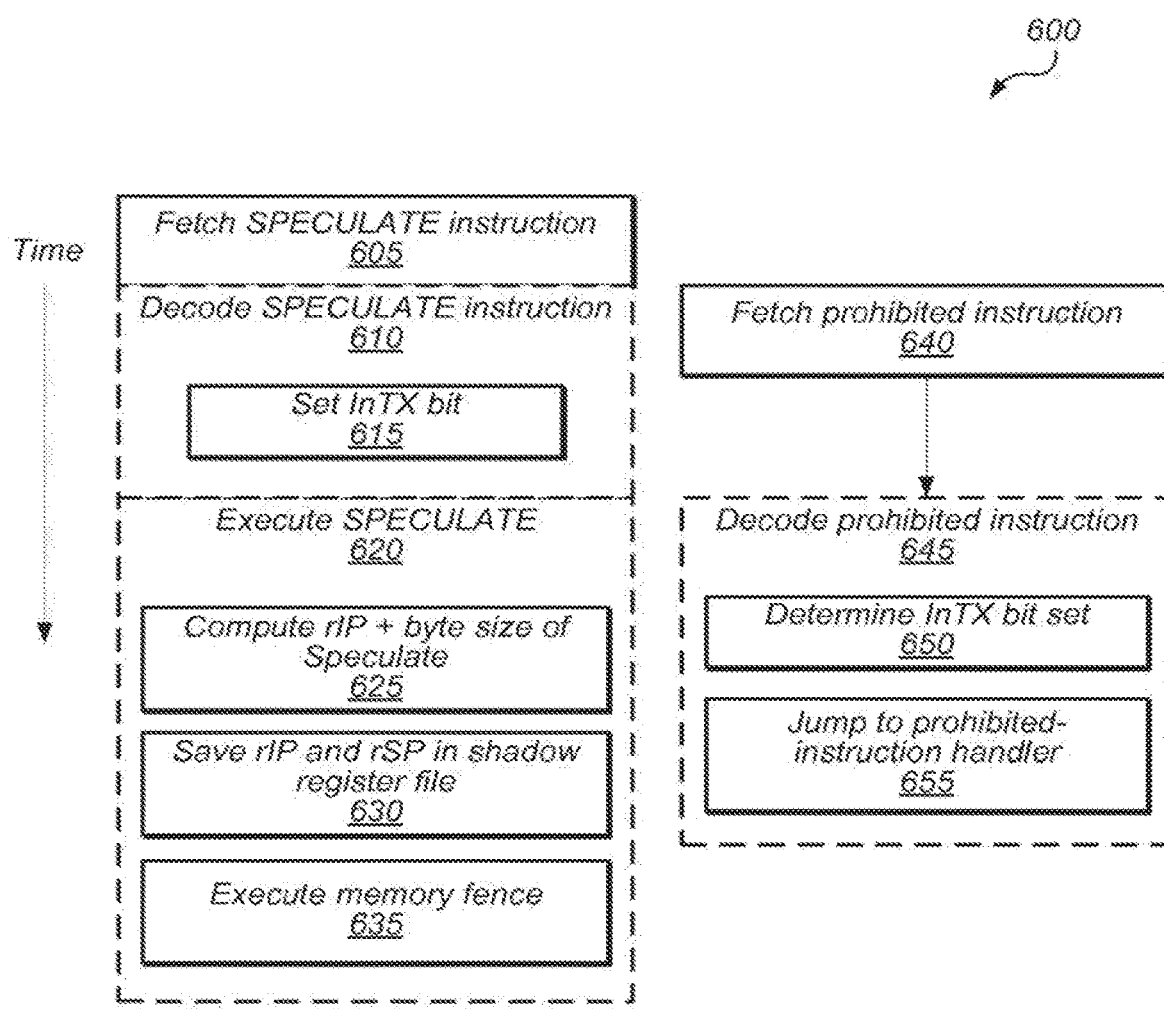
FIG. 6 is a sequence diagram initiating the execution of a SPECULATE instruction, according to various embodiments.

LOCK MOV: a memory operation that causes the processor to regard data at a given memory location as speculative and part of the currently active transaction RELEASE: indicates that a memory location previously identified by a LOCK MOV instruction should no longer be considered speculative ABORT: instructs the processor to abort a transaction in progress FIG. 6 is a sequence diagram illustrating the execution of a SPECULATE instruction, according to various embodiments. Timeline 600 may depict steps performed by a computer processor, such as processor 500 of FIG. 5, to handle a SPECULATE instruction.

According to the illustrated embodiment, an instruction fetcher (e.g., fetcher 502) may fetch the SPECULATE instruction, as in 605. In 610, an instruction decoder (e.g., decoder 504) may decode the SPECULATE instruction, as in 610.

In some embodiments, the SPECULATE instruction may be microcoded on a microcode ROM, as shown on microcode ROM 524. In response to identifying the SPECULATE instruction, the instruction decoder may set a flag in the decoder, as in 615, indicating that the processor is in speculative execution mode. For example, the decoder may set InTX flag 522 to indicate speculative execution.

After being decoded, the SPECULATE instruction may be dispatched, scheduled, and executed by an appropriate execution unit (e.g., 530), as in 620. According to the illustrated embodiment, executing the SPECULATE instruction may include computing the address to which execution should revert in the event of an abort, as in 625. In some embodiments, the processor may calculate this address as the current instruction pointer value plus the size of the SPECULATE instruction. Executing the SPECULATE instruction may also include saving the instruction pointer value determined in 625 and the current stack pointer values to a shadow register file, such as 508.

In some embodiments, executing the SPECULATE instruction may also comprise executing a memory fence microinstruction, as in 635. A memory fence microinstruction may instruct the processor to generate a dependency between SPECULATE and all LOCK MOV instructions occurring subsequently in program order within the speculative region. This may prevent the processor's out-of-order processing mechanisms from executing any LOCK MOV instructions within a speculative region before executing the SPECULATE instruction that initiates that region.

In some embodiments, various instructions may not be permissible within a speculative region. For example, particular HTM implementations may disallow some I/O instructions, system calls, and/or some instructions whose results cannot be obviated if a transactional attempt is aborted.

Setting a speculative execution flag (e.g., InTX flag 522) early in the execution pipeline (e.g., in the decoding stage at 615), may allow the processor to detect and handle prohibited instructions before they can be executed. For example, in timeline 600, the SPECULATE instruction is immediately followed by a prohibited instruction, which the instruction fetcher fetches in 640 while the SPECULATE instruction is being decoded in 610.

When the SPECULATE instruction moves to the next pipeline stage (execution), the decoder is free to decode the prohibited instruction, as in 645. However, the decoder may detect that the InTX flag 522 is set (as in 650) and that the instruction is prohibited within speculative regions. In response, decoder 504 may signal microcode 524 to jump to a prohibited instruction operation handler, as in 655.

Since the transaction attempt includes a prohibited instruction, the transaction attempt may be aborted. However, with out-of-order processing, this may not necessarily be required. For example, in some embodiments, the processor may utilize out-of-order execution and branch prediction mechanisms to implement run-ahead execution. As used herein, a processor configured to implement run-ahead execution may reach a branch instruction, speculate regarding the branch outcome, and continue executing instructions in the predicted execution path out of program order. Instructions executed speculatively as a result of a predicted branch that has not yet been resolved may be referred to herein as run-ahead instructions. In some embodiments, the results of these run-ahead instructions may be stored in a results queue, such as 430 or reorder buffer 523.

When the predicted branch instruction is finally executed and the branch therefore resolved, the processor may determine if the run-ahead execution was the correct execution path. If so, the processor may retire the run-ahead instructions by flushing them to the speculative buffer and/or to memory. Otherwise, the processor may discard the run-ahead results stored in the results queue.

In some embodiments, the processor may include mechanisms configured to present run-ahead instructions from causing the processor to abort a transaction attempt until the processor determines whether the run-ahead instructions are in indeed on the correct execution path or were executed as a result of branch misprediction. In some embodiments, the processor may accomplish this result by detecting abort conditions and in response, setting various flags in one or more appropriate results queue entries (e.g., the entry associated with the instruction that caused the abort condition to arise). Subsequently, when the processor is ready to retire the instruction (e.g., the corresponding entry has reached the head of the ROB), the processor may detect the abort condition and abort the transaction attempt. Thus, the processor only aborts the transaction attempt after vending that the instruction that caused the abort condition to arise was not executed as a result of a mispredicted branch.

Figure 7:
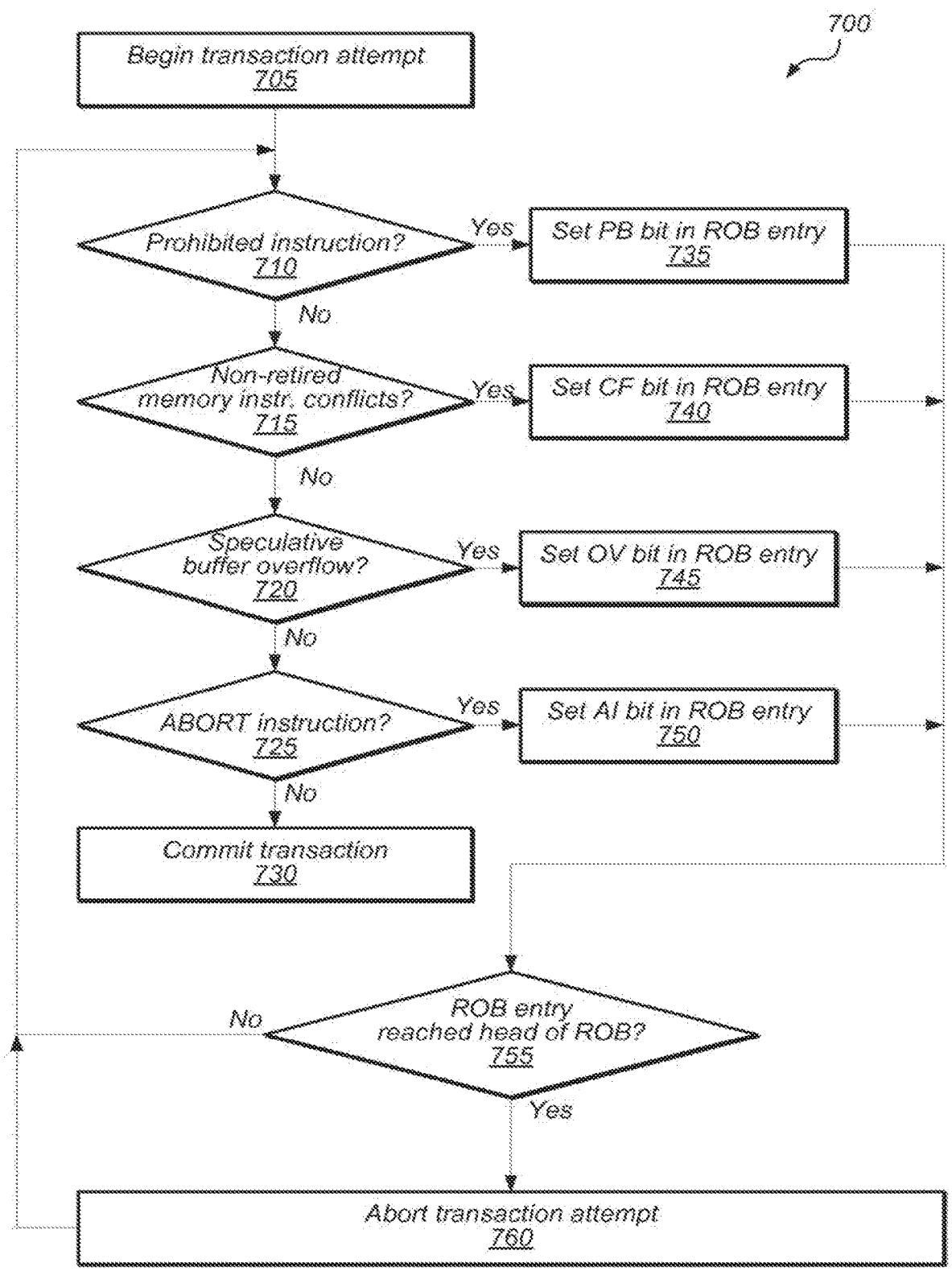
FIG. 7 is a flow diagram illustrating a method by which a processor may avoid aborting a transaction attempt as a result of executing a run-ahead instruction that is part of mispredicted execution path, according to various embodiments.

FIG. 7 is a flow diagram illustrating a method by which a processor may avoid aborting a transaction attempt as a result of executing a run-ahead instruction that is part of a mispredicted execution path, according to various embodiments. This capability may be referred to herein as abort condition verification. The method of FIG. 7 may be executed by a processor such as 500, which includes HTM, out-of-order processing using a reorder buffer (ROB), and branch prediction capabilities.

According to the illustrated embodiment, method 700 begins when the processor begins a transaction attempt, as in 705. For example, the processor may begin the transaction attempt in response to executing a SPECULATE instruction.

If the processor defects an abort condition during the transaction attempt, the processor may respond by setting a corresponding flag in the ROB. For example, each entry in ROB 532 (FIG. 5) includes a number of flags, including:

- OV flag 534—this flag may indicate that executing the instruction corresponding to this entry causes a speculative buffer overflow condition
- CF flag 536—this flag may indicate that executing the instruction corresponding to this entry causes a data conflict condition
- AI flag 538—this flag may indicate that the instruction corresponding to this entry is an ABORT instruction
- PB flag 540—this flag may indicate that the instruction corresponding to this entry is prohibited from being executed within a speculative region In the illustrated embodiment, if processor 500 detects in 710 that a given instruction within the speculative region is prohibited (as indicated by the affirmative exit from 710), the processor may signal microcode ROM 524 to jump to a prohibited instruction handler (as in 655). In 735, the prohibited instruction handler may set PB flag 540 for the ROB entry corresponding to the prohibited instruction and then wait for the instruction to reach the head of the ROB.

In some embodiments, the microcode may instruct the processor to wait for the instruction to reach the head of the ROB without executing the instruction. Thus, this mechanism may prevent the prohibited instruction from entering the execution stage of the pipeline, where it may cause the processor to perform operations whose effects the processor cannot undo (e.g., modifications to non-speculative resources such as segment registers).

If the instruction with the PB flat set reaches the head of the ROB, as indicated by the affirmative exit from 755, the processor may detect that the PB flag is set and initiate an abort procedure, as in 760. Since the instruction reached the head of the ROB, the processor has thus verified that the instruction is not a run ahead instruction that is part of a mispredicted execution path. Otherwise, if the entry does not reach the head of the ROB, as indicated by the negative exit from 755, then it may have been on a mispredicted execution path and therefore cleared before reaching the head of the ROB.

In various embodiments, a processor may verify other abort conditions in a similar manner. For example, if the processor detects that executing a given issued but not yet retired memory instruction would cause a data conflict (as indicated by the affirmative exit from 715), the processor may set the CF flag of the instruction's ROB entry, as in 740. If the entry reaches the head of the ROB (as indicated by the affirmative exit from 755) the processor may read the CF flag, thus determine that the instruction causes a data conflict, and in response, initiate an abort procedure (as in 760). Otherwise, if the entry does not reach the head of the ROB, as indicated by the negative exit from 755, then it may been on a mispredicted execution path and therefore cleared before reaching the head of the ROB.

In various embodiments, the processor may be configured to detect a data conflict with another core by checking cache coherence messages (i.e., probes) received from the other processors against data buffered in the speculative data buffer. If an incoming probe matches an entry in the speculative buffer (e.g., matching tags), then the processor may abort the transaction if either (a) the entry indicates a speculative write or (b) the probe indicates that the other processor stored a value in the specified memory location (i.e., the probe is invalidating).

In some embodiments, the processor may include various mechanisms for detecting such conflicts. For example, processor 500 includes conflict detector unit 560 configured to determine whether received probes conflict with entries in L1 cache 544. Processor 500 also includes conflict detectors 516 and 562 for determining whether received probes conflict with entries in load queue 512 and/or store queue 514 respectively. The conflict detectors 516, 560, and 562 may be configured to check respective SR and/or SW flags of entries that match any incoming probes.

In some embodiments the effects of a store instruction are visible to the rest of the system when they are transferred to the cache since the store queue may be considered a local write buffer. In some embodiments, the processor may broadcast the existence of the speculative store buffered in the store queue using an exclusive permission request for the store that the processor sends to other processors via an processor interconnect (e.g., coherent hyperTransport fabric 546) when the instruction retires. The request may enable other cores to detect a conflict against the store. Once the exclusive permission is obtained, the EP (exclusive permission) flag (e.g., 558) is set for the store queue entry.

In some embodiments, if a non-speculative memory access distraction cannot be cached without evicting speculative data, the L1 cache may handle the non-speculative instruction as an uncacheable type. By giving higher priority to the cache lines with the SW/SR flags set, the L1 cache eviction policy allows the system to avoid some speculative buffer overflow conditions.

In some embodiments, the processor may check a load instruction for data conflicts even before the load instruction retires. For example, in response to conflict detector 516 determining a data conflict with a load instruction load queue 512 (as in the affirmative exit from 715), the load queue may set the CF flag of the ROB entry corresponding to the non-retired load (as in 740). If the entry reaches the head of the ROB (as indicated by the affirmative exit from 755) the processor may read the CF flag, thus determine that the instruction causes a data conflict, and in response, initiate an abort procedure (as in 760). However, if the instruction were a run-ahead instruction that were part of a mispredicted path, it would never reach the head of the ROB. Thus, the processor may eliminate false conflicts due to mispredicted run-ahead execution.

In some embodiments, the processor may report conflicts with retired instructions to ROB as interrupts that indicate a given abort code. Since these instructions are already retired, their ROB entries may not exist. Therefore, the ROB may initiate an abort procedure when the CF flag of the head entry is set or upon receiving such an interrupt. The processor may then reply to the sender of the probe that caused the abort as though the processor is not caching data corresponding to the tag indicated by the probe.

In some embodiments, a processor may similarly verify other abort conditions, such as a speculative buffer overflow condition. A speculative buffer overflow condition may arise when the processor executes a speculative memory access operation, but has insufficient capacity in the speculative buffer to buffer the results of this operation. In some embodiments, a processor may include capacity checking mechanisms configured to detect insufficient capacity conditions in particular hardware structures that collectively implement the speculative buffer. For example, processor 500 includes capacity checkers 515 and 548 for determining overflow in L1 cache 544 and LS unit 510.

In response to a speculative buffer overflow condition, a processor may elect to abort the transaction attempt. However, in some embodiments, the processor may be configured to first verify whether the instruction that triggered the speculative buffer overflow condition is of a mispredicted run-ahead execution path. If so, then the processor may not need to abort the transaction attempt.

According to the illustrated embodiment, if a processor detects that executing a given instruction would cause a speculative buffer overflow condition (as indicated by the affirmative exit from 720), the processor may set a flag (e.g., CF flag 536) in the ROB entry corresponding to the given instruction, as in 745. If the ROB entry reaches the head of the ROB, as indicated by the affirmative exit from 755, then the processor may abort the transaction attempt, as in 760. Otherwise, if the entry does not reach the head of the ROB, as indicated by the negative exit from 755, then it may have been on a mispredicted execution path and cleared before reaching the head of the ROB.

In some embodiments, a processor may similarly verify whether an ABORT instruction could cause the processor to abort a transactional attempt or whether the instruction is actually on a mispredicted execution path. In method 700, if the processor detects an ABORT (as indicated by the affirmative exit from 725), the processor may set a flag (e.g., AI flag 538) in the ROB entry corresponding to the ABORT instruction, as in 750. If the ROB entry reaches the head of the ROB, as indicated by the affirmative exit from 755, then the processor may abort the transaction attempt, as in 760. Otherwise, if the entry does not reach the head of the ROB, as indicated by the negative exit from 755, then it may have been on a mispredicted execution path and cleared before reaching the head of the ROB.

Figure 8:
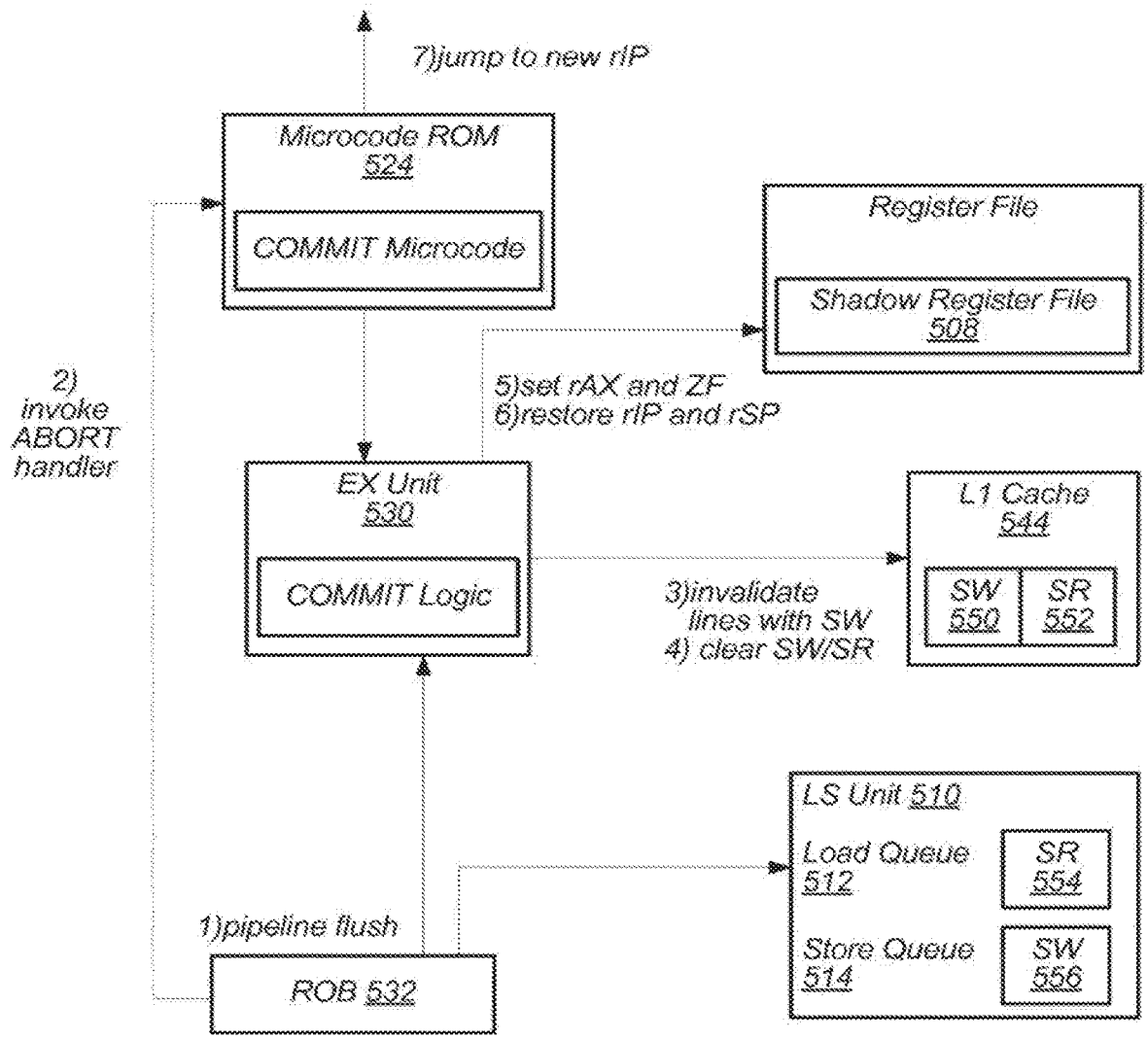
FIG. 8 illustrates a method for aborting a transactional attempt, according to some embodiments.

FIG. 8 illustrates a method for aborting a transactional attempt according to some embodiments. In some embodiments, this method may correspond to step 760 of FIG. 7 and may be performed in response to any of various different abort conditions (e.g., prohibited instruction, data conflict, speculative buffer overflow, ABORT instruction, etc.).

FIG. 8 illustrates information flow among a plurality of processing components. In some embodiments, these processing components may correspond to the analogously numbered components of processor 500.

According to the illustrated embodiment, the method begins when ROB 532 initiates a pipeline flush, which invalidates all ROB entries and load/store queue entries. Next, the ROB invokes the microcoded abort handler in microcode ROM 524 with an abort status code.

According to the illustrated embodiment, the abort handler microcode then executes on unit 530. This execution includes invalidating the L1 cache lines that hold speculatively written data (i.e., have SW flags set), clearing the speculative flags (SW, SR) in the L1 cache to no longer indicate that the corresponding entries hold speculative data, setting one or more status registers (e.g., rAX, ZF) such as to values indicating the abort code, and reading the saved instruction pointer and stack pointer (rIP, sIP) values from shadow register file 508.

In some embodiments, if the abort code indicates that the abort was due to an exception or interrupt, the microcode may set an exception instruction pointer (e.g., HTM_Exception_IP 548) to the current rIP (i.e., the location of the instruction that triggered the exception), restore the rIP and rSP register values to those stored in the shadow register file 508, and jump to the existing exception handler in the microcoded ROM. In some embodiments, the exception handler effectively behaves as though the exception was triggered by the instruction immediately following the SPECULATE instruction that began the speculative region.

In some embodiments, if the abort code does not indicate that an exception or interrupt triggered the abort, the abort handler microcode may store the rIP and rSP registers to the corresponding values stored in the shadow register file 508 and execute a jump micro-operation to redirect the instruction fetcher to the saved rIP. In some embodiments, the jump micro-op may flush the front-end pipeline (i.e., stages from the instruction fetcher to the dispatcher).

According to method 700 if the processor does not detect any abort conditions during the transactional attempt, as indicated by the negative exits from 710-725, the processor may commit the transaction attempt (as in 730), such as by executing a COMMIT instruction.

Figure 9:
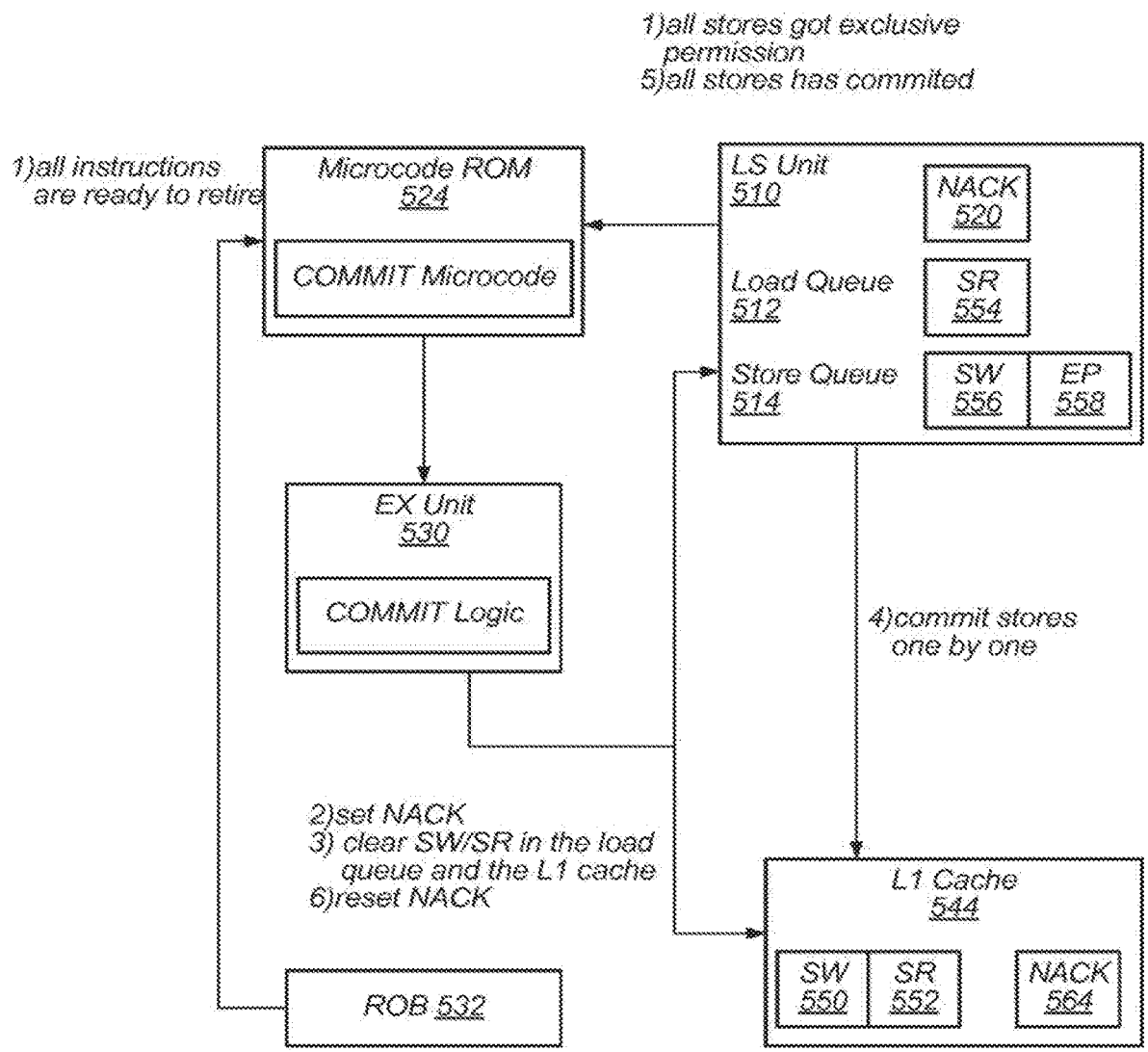
FIG. 9 illustrates a method for committing a transactional attempt according to some embodiments.

FIG. 9 illustrates a method for committing a transactional attempt, according to some embodiments. In some embodiments, this method may correspond to step 730 of FIG. 7 and may be performed as part of executing a COMMIT instruction. FIG. 8 illustrates information flow among a plurality of processing components. In some embodiments, these processing components may correspond to the analogously numbered components of processor 500.

In some embodiments, the COMMIT instruction may be microcoded and may be stored in a ROM, such as ROM 524. According to the illustrated embodiment, in response to detecting a COMMIT instruction, the instruction decoder may correspond to the analogously numbered components of processor 500.

In some embodiments, the COMMIT instruction may be microcoded and many be stored in a ROM, such as ROM 524. According to the illustrated embodiment, in response to detecting a COMMIT instruction, the instruction decoder may reset the InTX flag and signal the dispatcher to read the COMMIT microcode.

In some embodiments, the microcode ROM may stall the process of dispatching micro-ops until a wait condition specified in the microcode is satisfied. In some embodiments, the wait condition may include 1) that all instructions in the ROB are ready to retire without exceptions and 2) that all retired stores in the store queue have obtained exclusive permissions.

After the wait condition is met, the processor may execute the COMMIT microcode as shown in FIG. 9. In some embodiments, execution of the COMMIT microcode may be uninterruptable (e.g., by interrupts, cache coherence messages, exceptions, context switches, etc.).

According to the illustrated embodiment, the logic signals L1 cache 544 and LS unit 510 to set their respective NACK flags 564 and 520. In some embodiment when the NACK flags are set, the processor may respond so conflicting cache coherence messages with NACK responses instead of aborting the current speculative region. The NACK response (i.e., negative acknowledgement) cause the core receiving the NACK to resend the cache coherence message later. There is no deadlock due to the NACKING because the committing speculative region holds all necessary exclusive permissions to complete the COMMIT.

The logic may next commit the data in the speculative buffer. For example, this may include clearing the SW/SR flags from L1 cache 544 and from load queue 512. In some embodiments, clearing speculative flags from the L1 enables the store queue to resume transferring the speculative data from store queue 514 to L1 cache 544, if any such speculative data exists. In some embodiments, the transfer mechanism may check that the NACK flag is set and in response, not set the respective SW flags for any cache entries into which this data is transferred. In some embodiments, if the processing core receives a cache coherence message identifying such an entry, the message would not indicate a data conflict, since the SW flag is not set. Therefore, such a message would not indicate an abort condition. Thus, using the NACK function, the processor may ensure that the COMMIT instruction is executed atomically and not interrupted by external events.

In some embodiments, the microcode may then stall on another wait condition that checks that no store queue entry has the SW flag set and therefore, all new values have been transferred to the L1 cache and are visible to the rest of the system.

According to the illustrated embodiment, once all speculative data has been committed, the COMMIT logic may revoke the NACK setting. For example, the logic may signal L1 cache 544 and LS unit 510 to reset their respective NACK flags to values indicating that the COMMIT is no longer in progress. In some embodiments the COMMIT procedure may be complete at this point. The shadow register file may be left in place and subsequently overwritten by the next SPECULATE instruction.

Figure 10:
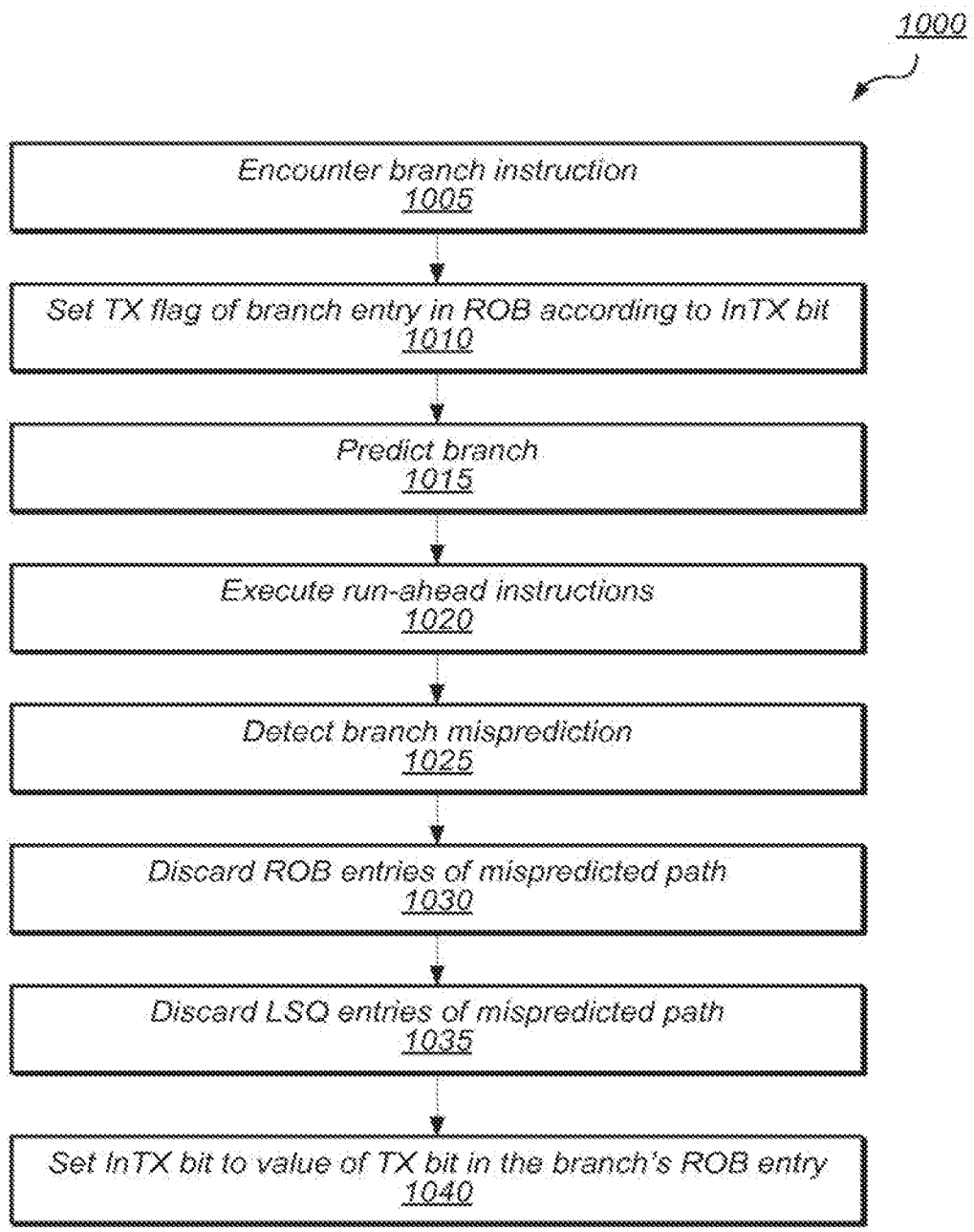
FIG. 10 is a flow diagram illustrating a method for recovering from a branch misprediction that occurs within a speculative region of code, according to various embodiments.

FIG. 10 is a flow diagram illustrating a method for recovering from a branch misprediction that occurs within a speculative region of code, according to various embodiments. Method 1000 may be executed by a processor with HTM and out-of-order capabilities, such as processor 500.

According to the illustrated embodiment, method 1000 begins when the processor encounters a branch instruction during execution, as in 1005. In some instances, the processor may already be within a speculative region when encountering the branch instruction at 1005. However, in other instances, the processor may encounter the branch instruction outside of a speculative region, but then enter a speculative region while executing a run-ahead execution path.

In response to encountering the branch instruction, the processor may locate the ROB entry corresponding to the branch instruction and set a flag in the entry. For example, the processor may set TX flag 542 in the branch instruction's ROB entry to a value indicating the current value of InTX flag 522 in decoder 504. Thus, in 1010, the processor effectively records whether or not the processor was in speculative or non-speculative execution mode when it encountered the branch.

The processor may then predict the branch using various branch prediction techniques (as in 1015) and execute run-ahead instructions (as in 1020). In some instances, if the branch was not already executed as part of a speculative region, the run-ahead instructions may enter such a region.

In 1025, the processor's branch prediction facilities may detect that the branch was mispredicted (e.g., after the branch is executed). In response to this misprediction, the processor may be configured to discard the ROB entries and load/store queue entries of the mispredicted path, as in 1030 and 1035 respectively. Lastly, the processor may restore InTX flag 522 to the value indicated by the TX flag (e.g., 542) of the mispredicted branch's ROB entry. Thus, the processor may restore the proper speculative mode state when execution returns to the correct branch of execution, as indicated by the resolved branch instruction.

As described above, in some embodiments, the processor may implement a RELEASE instruction that is executable within a speculative region to indicate that a memory location that was speculatively read within the speculative region should no longer be considered speculative. In some embodiments, such as that of processor 500, execution of this instruction may include unsetting an SR flag associated in the speculative buffer with the speculatively read data.

In some embodiments, a processor that receives a RELEASE instruction (i.e., fetches and decodes the RELEASE instruction) may dispatch the instruction but not execute the instruction further until the instruction's corresponding ROB entry reaches the head of the ROB. When the entry reaches the head, the ROB may signal the RELEASE execution logic (as in execute unit 530) to execute. Since the RELEASE entry is at the head of the ROB, the appropriate SR flag that the processor should reset may be either in the L1 cache or in the portion of the load queue that contains retired loads. Therefore, in such embodiments, the RELEASE logic may signals the L1 cache and the load queue to reset the appropriate SR flag (of any entry corresponding to the loaded data) and then signal the ROB to complete the RELEASE.

In some embodiments, the processor may also ensure that no speculative memory access instructions (e.g., LOCK MOV) that appear subsequent to the RELEASE instruction in program order are executed before the RELEASE instruction. If this were to happen, then the execution may be incorrect since the RELEASE instruction may unset a speculative flag (e.g., SR flag) that a subsequent (in program order) speculative memory access operation had set.

In some embodiments, the processor may store an indication of the RELEASE instruction in the load queue and/or a miss address buffer (MAB) such that subsequent speculative loads can alias with the RELEASE instruction and vice versa. In other embodiments, the processor may search for such speculative memory access operations in the LSQ and in response to finding one, obviate execution of the RELEASE instruction altogether (e.g., execute a NOP in place of the RELEASE instructions. In yet another embodiment, if the processor finds such a subsequent speculative load, it may replay the load eventually (e.g., when the load instruction's ROB entry reaches the head of the ROB buffer), thereby allowing the load to reset the appropriate speculative flag.

Figure 11:
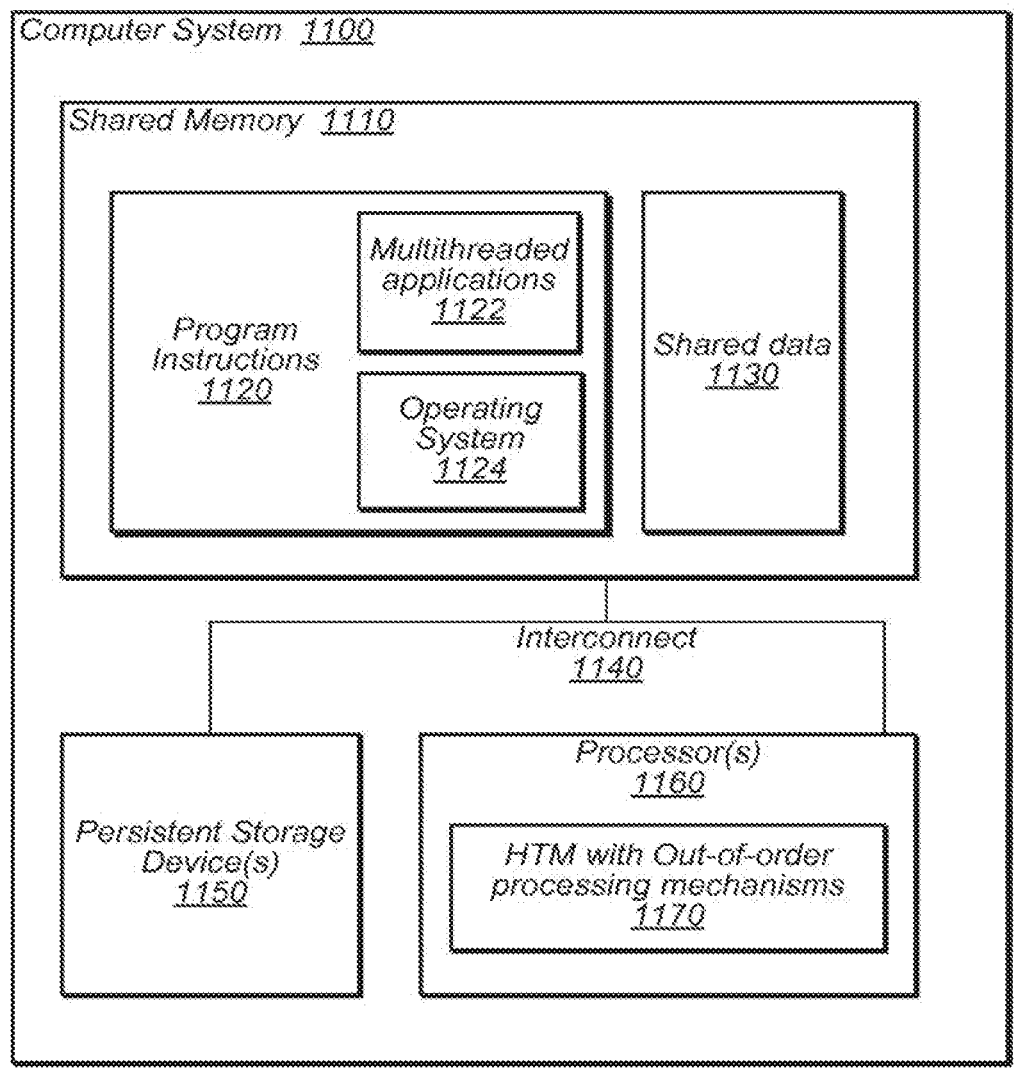
FIG. 11 is a block diagram illustrating a computer system configured to implement hardware transactional memory with out-of-order processing as described herein, according to various embodiments.

FIG. 11 is a block diagram illustrating a computer system configured to implement hardware transactional memory with out-of-order processing as described herein, according to various embodiments. The computer system 1100 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc. or in general any type of computing device.

Computer system 1100 may include one or more processors 1160, any of which may include multiple physical and/or logical cores. Processors 1160 may include respective mechanisms to implement HTM with out-of-order processing as described herein, such as mechanisms 1170. For example, in some embodiments, one or more processors 1160 may include components arranged as processor 500 of FIG. 5.

Computer system 1100 may also include one or more persistent storage devices 1150 (e.g. optical storage, magnetic storage, hard drive, tape drive, solid state memory, etc), which may persistently store data.

According to the illustrated embodiment, computer system 1100 may include one or more shared memories 1110 (e.g., one or more of cache, SRAM, DRAM, RDRAM, EDO RAM, DDR 10 RAN, SDRAM, Rambus RAM, EEPROM, etc.), which may be shared between multiple ones of processors 1160. The one or more processors 1060, the storage device(s) 1150, and the shared memory 1110 may be coupled via interconnect 1140. In various embodiments, the system may include fewer or additional components not illustrated in FIG. 11 (e.g., video cards, audio cards, additional network interfaces, peripheral devices, a network interface such as an ATM interface, an Ethernet interface, a Frame Relay interface, monitors keyboards, speakers, etc.).

In some embodiments, shared memory 1110 may store program instructions 1120, which may be encoded in platform native binary, any interpreted language such as Java™ byte-code, or in any other language such as C/C++, Java™, etc or in any combination thereof. Program instructions 1120 may include program instructions to implement one or more multi-threaded applications 1122, which include speculative sections of code. In some embodiments, program instructions 1120 may also include instructions executable to implement an operating system 1124 that provides software support for executing applications 1122 (e.g., scheduling, software signal handling, etc.).

According to the illustrated embodiment, shared memory 1110 may include shared data 1130, which may be accessed by multiple ones of processors 1160. Ones of processors 1160 may cache various components of shared data 1130 in local caches, and coordinate the data in these caches by exchanging messages according to a cache coherence protocol, as described herein.

Program instructions 1120, such as those used to implement multithreaded applications 1122 and/or operating system 1124, may be stored on a computer-readable storage medium. A computer-readable storage medium may include an mechanisms for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions.

A computer-readable storage medium as described above may be used in some embodiments to store instructions read by a program and used, directly or indirectly, to fabricate the hardware comprising one or more of processors 1160. For example, the instructions may describe one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of processor 500. The netlist may then be placed and routed to produce a data set describing geometric shapes to be applied to masks. The masks may then be used in various semiconductor fabrication steps to produce a semiconductor circuit or circuits corresponding to processor 500. Alternatively, the database may be the netlist (with or without the synthesis library) or the data set, as desired.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed:

1. An apparatus, comprising:
a processing core of a plurality of processing cores, wherein the processing core is configured to execute a speculative region of code as a single atomic memory transaction with respect to one or more others of the plurality of processing cores, wherein an end of the speculative region is indicated by a predefined ending instruction executable by the processing core, wherein the processing core is configured to add program instructions to corresponding entries of a reorder buffer in response to the program instructions being issued, wherein the processing core is configured to set a flag associated with one of the entries in the reorder buffer in response to detecting an abort condition for a corresponding one of the issued program instructions, and wherein the processing core is configured to abort execution of the speculative region of the code in response to an entry at a head of the reorder buffer having a set flag indicating a detected abort condition; wherein execution of the ending instruction by the processing core comprises causing the processing core to respond to a cache coherence message sent by another of the plurality of processing cores with a negative acknowledgement, wherein the another processing core is configured to respond to the negative acknowledgement by resending the cache coherence message.

2. The apparatus of claim 1, wherein the responding to the cache coherence message with a negative acknowledgement is based on the cache coherence message indicating a data conflict with one or more memory access operations executed as part of executing the speculative region.

3. The apparatus of claim 1, wherein the abort condition for the issued instruction is determined at least in part by determining that the processing core received the cache coherence message indicating a portion of shared memory, and wherein execution of the issued instruction comprises accessing the portion of shared memory.

4. An apparatus comprising:
a processing core of a plurality of processing cores, wherein the processing core is configured to execute a speculative region of code comprising a plurality of program instructions as a single atomic memory transaction with respect to one or more others of the plurality of processing cores;
wherein the processing core is configured to execute one or more of the program instructions out of program order, add program instructions to corresponding entries of a reorder buffer in response to the program instructions being issued, set a flag associated with one of the entries in the reorder buffer in response to detecting an abort condition for a corresponding one of the issued program instructions, and abort execution of the speculative region of the code in response to an entry at a head of the reorder buffer having a set flag indicating a detected abort condition; and
wherein execution of the speculative region of code by the processing core comprises:
storing an indication that data read by the processing core in executing one or more of the plurality of program instructions is speculative; and
in response to detecting a release instruction in the speculative region, storing an indication that the data is no longer speculative.

5. The apparatus of claim 4, wherein storing an indication that the data is no longer speculative is performed as part of executing the release instruction; wherein the processing core is configured to execute the release instruction in response to determining that all instructions of the speculative region previous in program order to the release have been retired.

6. The apparatus of claim 4, wherein execution of the speculative region of code by the processing core comprises unsetting a flag associated with speculatively read data in a speculative buffer.

7. The apparatus of claim 4, further comprising:
a reorder buffer to hold entries for out-of-order processing, wherein entries in the reorder buffer include instructions that have not yet been retired.

8. The apparatus of claim 7, wherein the processing core is configured to dispatch the release instruction but not execute the release instruction further until the release instruction's corresponding entry in the reorder buffer reaches the head of the reorder buffer.

* * * * *